(12) United States Patent
Horn et al.

(10) Patent No.: US 9,491,408 B2
(45) Date of Patent: Nov. 8, 2016

(54) TECHNIQUE FOR DISTRIBUTING CONTENT VIA DIFFERENT BEARER TYPES

(75) Inventors: Uwe Horn, Aachen (DE); Thorsten Lohmar, Aachen (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1284 days.

(21) Appl. No.: 12/096,694

(22) PCT Filed: Jan. 17, 2006

(86) PCT No.: PCT/EP2006/000374
§ 371 (c)(1),
(2), (4) Date: Aug. 19, 2008

(87) PCT Pub. No.: WO2007/068290
PCT Pub. Date: Jun. 21, 2007

(65) Prior Publication Data
US 2009/0019509 A1    Jan. 15, 2009

(30) Foreign Application Priority Data

Dec. 13, 2005  (EP) .................................. 05027248

(51) Int. Cl.
*H04N 5/445* (2011.01)
*H04N 7/173* (2011.01)
(Continued)

(52) U.S. Cl.
CPC .............. *H04N 7/173* (2013.01); *H04H 20/24* (2013.01); *H04H 20/26* (2013.01); *H04L 63/20* (2013.01); *H04N 21/235* (2013.01); *H04N 21/4143* (2013.01); *H04N 21/435* (2013.01); *H04N 21/4383* (2013.01); *H04N 21/6131* (2013.01); *H04N 21/64* (2013.01); *H04N 21/6543* (2013.01); *H04N 21/6582* (2013.01); *H04H 2201/30* (2013.01); *H04N 5/50* (2013.01); *H04N 7/17318* (2013.01)

(58) Field of Classification Search
CPC ............................ H04N 5/50; H04N 7/17318
USPC ..................................................... 725/56, 95
See application file for complete search history.

(56) References Cited

U.S. PATENT DOCUMENTS 5,684,799 A * 11/1997 Bigham et al. ............... 370/397
6,130,898 A * 10/2000 Kostreski et al. ............ 370/522
(Continued)

FOREIGN PATENT DOCUMENTS

| EP | 0 817 413 A |   | 1/1998 |           |
|----|-------------|---|--------|-----------|
| WO | WO 01/72076 | * | 9/2001 | H04Q 7/38 |
| WO | WO 01/72076 A |   | 9/2001 |         |

OTHER PUBLICATIONS

Horn, et al., Interactive mobile streaming services—the convergence of broadcast and mobile communication, EBU Technical Review, Sep. 1999, p. 14-19.

*Primary Examiner* — Michael Hong

(57) ABSTRACT

A technique for controlling the distribution of content via broadcast bearers and non-broadcast bearers is described. A method embodiment of this technique includes the steps of providing a plurality of content channels, each content channel being associated with at least one of a first bearer type and a second bearer type, maintaining mapping information for the content channels, the mapping information being indicative of the bearer associations between content channels and bearer types, and controlling content distribution in accordance with the associations between content channels and bearer types.

10 Claims, 4 Drawing Sheets

(51) Int. Cl.
*H04H 20/24* (2008.01)
*H04H 20/26* (2008.01)
*H04L 29/06* (2006.01)
*H04N 21/235* (2011.01)
*H04N 21/4143* (2011.01)
*H04N 21/435* (2011.01)
*H04N 21/438* (2011.01)
*H04N 21/61* (2011.01)
*H04N 21/64* (2011.01)
*H04N 21/6543* (2011.01)
*H04N 21/658* (2011.01)
*H04N 5/50* (2006.01)

(56) References Cited

U.S. PATENT DOCUMENTS

| | | | |
|---|---|---|---|
| 6,351,474 B1* | 2/2002 | Robinett et al. | 370/486 |
| 7,222,185 B1* | 5/2007 | Day | 709/232 |
| 7,260,601 B1* | 8/2007 | Day et al. | 709/203 |
| 2002/0023165 A1* | 2/2002 | Lahr | 709/231 |

\* cited by examiner

TECHNIQUE FOR DISTRIBUTING CONTENT VIA DIFFERENT BEARER TYPES

FIELD OF THE INVENTION

The invention generally relates to the field of content distribution services such as television (TV) services. In particular, the invention relates to a content distribution technique that employs different transport bearer types.

BACKGROUND OF THE INVENTION

Today, mobile TV services and other content distribution services are delivered over existing networks using so-called unicast delivery. Unicast delivery means that each user terminal gets its own unique data connection for accessing one or more content channels. One drawback of this approach is that it does not scale satisfactorily if an increasing number of user terminals is starting to use a particular service.

An alternative to unicast delivery is broadcast delivery. In a broadcast scenario each content channel is distributed to all user terminals simultaneously. In this way, the number of data connections can be significantly reduced because the number of required data connections only depends on the number of distributed content channels and no longer on the number of active user terminals.

Although broadcasting reduces the number of required data connections, it is important to understand that broadcasting is not always the most efficient way of delivering content channels. In a typical broadcast scenario, content channels are transmitted even if there are no user terminals listening to them since the broadcasting system does not have any knowledge about who is listening to a channel and who is not. Furthermore, the transmission power of a broadcast bearer in a radio cell cannot be adapted to the receive conditions of different user terminals. Instead it must be sufficiently high such that even user terminals with bad coverage can still receive a good enough signal.

Compared to broadcast, unicast delivery has the advantage that network resources are only allocated if requested. Furthermore, with unicast delivery a base station can optimize its transmission power for each user terminal individually such that user terminals closer to the base station require less power than user terminals further away.

In addition to broadcast and unicast, multicast is a third transport alternative. Multicast adds group management capabilities to broadcast. However, support for multicast requires an increased implementation effort. Multicast support can for example be provided via the Multimedia Broadcast Multicast Service (MBMS).

Conventional TV content channels are typically located for a long time on one physical transport bearer. This means that a frequency or a location in a multiplex scheme is permanently assigned to one content channel. Today's TV does not implement any function to automatically re-configure the content transmission parameters. However, there is also no need to offer a TV channel re-location functionality, since anyhow all transport channels are broadcast transport channels.

There is a need for a content distribution/reception technique that allows to make use of the combined advantages of different bearer types.

SUMMARY OF THE INVENTION

According to one aspect of the invention, a method is provided for controlling the distribution of content via a first bearer type including at least one broadcast bearer and a second bearer type including at least one non-broadcast bearer. The method comprises the steps of providing a plurality of content channels, wherein each content channel is associated with at least one of a bearer of the first type and a bearer of the second type, maintaining mapping information for the content channels, the mapping information being indicative of the associations between content channels and bearer types, and controlling content distribution in accordance with the associations between content channels and bearer types.

Each content channel can be distributed via exactly one bearer or simultaneously with a plurality of bearers. In the case a content channel is distributed via a plurality of bearers, the plurality of bearers may include at least one bearer of the first type and at least one bearer of the second type.

The step of maintaining mapping information can be performed in various ways and may include at least one of generating, storing, and modifying (e.g. updating) mapping information. In one example, the mapping information comprises for each content channel a content channel identifier (such as a particular rank within a list or an explicit channel descriptor) and an associated access descriptor (e.g. an abstract denotation of a particular bearer type or an explicit description of a bearer having a particular bearer type). A mapping scheme comprising the mapping information can be realized in the form of an abstract mapping function, in the form of an explicit mapping table and/or in any other form suitable for establishing an association between one or more content channels on the one hand and different bearer types on the other hand.

The at least one non-broadcast bearer may comprise at least one unicast bearer and the at the least one broadcast bearer may comprise at least one multicast bearer. In addition to, or instead of, the at least one multicast bearer, the at least one broadcast bearer may comprise one or more conventional broadcast bearers.

The method may further comprise the step of transmitting the mapping information to a recipient of one or more content channels. According to a first variant, the mapping information is transmitted before the content recipient actually starts receiving content via one or more of the content channels. The first variant may be performed to notify the content recipient of the bearer and/or bearer type via which a particular content channel is or will be transmitted. According to a second variant, that can be combined with the first variant, the mapping information is transmitted to a content recipient while the content recipient is receiving one or more content channels. The second variant permits the content recipient to keep track of modifications in the mapping information. The modifications may result from switching a particular content channel between two bearers of the same type and/or of different bearer types.

Accordingly, the method may further comprise the steps of initiating bearer switching for at least one content channel between two bearers of the same type and/or of different bearer types, and maintaining the mapping information by modifying (i.e. updating) the mapping information in accordance with the bearer switching. Preferably, the modified mapping information is transmitted at least to those recipients currently receiving the one or more content channels for which bearer switching has been or will be initiated.

In a further implementation, the method additionally comprises the steps of evaluating switching control information, and deciding about initiation of bearer switching based on a result of the evaluation. The switching control information may include at least one of content usage information, time of the day, predicted user interest, and location information (such as a cell identifier) with regard to mobile content recipients. The switching control information (such as, in particular, content usage information and location information) may be gathered from the various content recipients. To this end, the content recipients may be configured to generate and transmit switching control information.

According to another aspect of the present invention, a method of selectively receiving content via one of a first bearer type including at (east one broadcast bearer and a second bearer type including at least one non-broadcast bearer is provided. The method comprises the steps of accessing mapping information indicating that a particular content channel is distributed via at (east one of a bearer of the first type and a bearer of the second type, and switching to a bearer of the type indicated in the mapping information for reception of the particular content channel.

The above method may additionally comprise the step of receiving modified mapping information during reception of the particular content channel. Thus, modifications in the mapping information for the particular content channel may be monitored, and based on detected modifications in the mapping information bearer switching may be performed.

A non-broadcast bearer (such as a unicast bearer) may be established between a content distribution controller and a content recipient not only for content reception. The non-broadcast bearer may for example also, or alternatively, be employed for an initial or repeated transfer of mapping information from the content distribution controller to the content recipient. Also, the non-broadcast bearer may be used for transmitting switching control information from the content recipient to the content distribution controller. Preferably, the non-broadcast bearer is maintained during a content distribution session regardless of bearer type changes taking place during the content distribution session with respect to the particular content channel to which the content distribution session pertains.

The invention may be practised in the form of a hardware solution, as a software solution or as a software/hardware combination. As far as a software solution is concerned, a computer program product is provided comprising program code portions for performing the steps of the method when the computer program product is run on one or more computing devices. The computer program product may be stored on a computer readable recording medium.

According to a hardware aspect, a device for controlling the distribution of content via a first bearer type including at least one broadcast bearer and a second bearer type including at least one non-broadcast bearer is provided. The controlling device comprises a provision component for providing a plurality of content channels, wherein each content channel is associated with at least one of a bearer of the first type and a bearer of the second type, a maintenance component for maintaining mapping information for the content channels, the mapping information being indicative of the associations between content channels and bearer types, and a controller for controlling the content distribution in accordance with the associations between content channels and bearer types.

According to a further hardware aspect, a device for selectively receiving content via one of a first bearer type including at least one broadcast bearer and a second bearer type including at least one non-broadcast bearer is provided. The receiving device comprises an access component for accessing mapping information indicating that a particular content channel is distributed via at least one of a bearer of the first type and a bearer of the second type, and a switch for switching to a bearer of the type indicated in the mapping information for reception of the particular content channel.

BRIEF DESCRIPTION OF THE DRAWINGS

In the following, the invention will be described with reference to exemplary embodiments illustrated in the drawings, wherein.

DETAILED DESCRIPTION OF THE PREFERRED EMBODIMENTS

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The technique of separating logical content channels from the underlying transport bearers illustrated below advantageously supports a dynamic mapping between logical content channels and transport bearers of different types. The hybrid approach combining broadcast and non-broadcast bearers facilitates dynamic changes in the mapping with respect to non-broadcast transmitted content channels and broadcast transmitted content channels. It is thus possible to offer content distribution services such as mobile TV services selectively via a unicast network, an MBMS network, a Digital Video Broadcast-Handheld (DVB-H) network or any other network type in a resource optimized and flexible manner. Also, the content distribution concept can be implemented such that it is completely transparent to the user which bearer type is used for delivery of a particular content channel. This means that the user does in general not notice whether a content channel is delivered over a broadcast or non-broadcast bearer.

Figure 1:
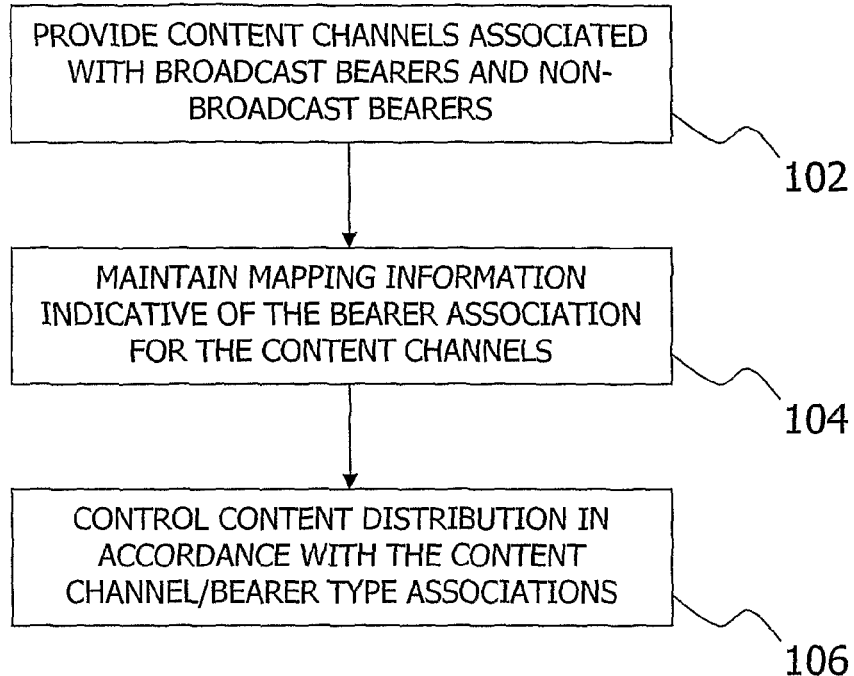
FIG. 1 is a process flow diagram of a first method embodiment of the invention.

FIG. 1 shows a process flow diagram 100 of a first method embodiment relating to the control of content distribution via a first bearer type including at least one broadcast bearer and a second bearer type including at least one non-broadcast bearer.

In a first step 102, a plurality of content channels are provided. Each content channel is associated with at least one of a bearer of the first type and a bearer of the second type. For example, a first content channel may be associated with a broadcast bearer, a second content channel may be associated with a unicast bearer, and third content channel may associated with both a broadcast bearer and a unicast bearer.

In a second step 104, mapping information for the plurality of content channels is maintained. The mapping information is indicative of content channel/bearer type associations. In one variation, the maintenance of mapping information includes generating mapping information in accordance with the associations of step 102.

In a further step 106, content distribution is controlled in accordance with the content channel/bearer type associations. In this regard, the mapping information may constitute control information for the content distribution. However, according to another option, the mapping information may simply be reflective of the content distribution control. In the latter case, steps 104 and 106 may be performed in any order.

Figure 2:
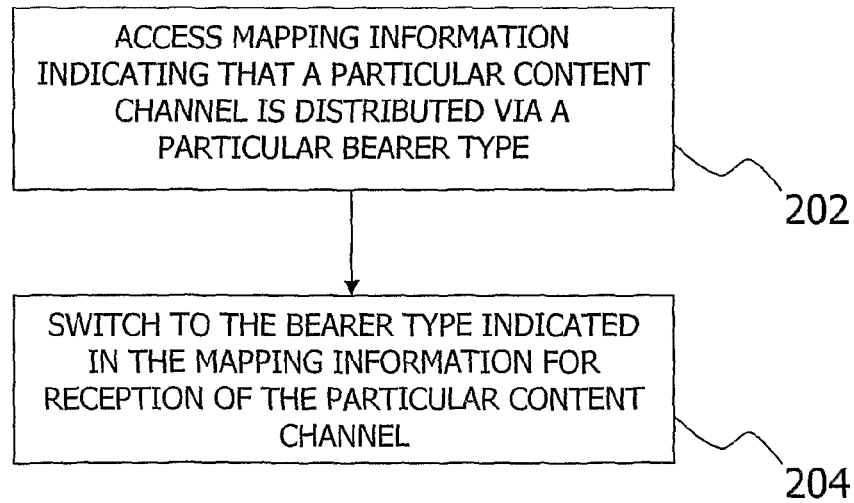
FIG. 2 is a process flow diagram of a second method embodiment of the present invention.

FIG. 2 shows a process flow diagram 200 of another method embodiment relating to the reception of content via one of a first bearer type including at least one broadcast bearer and a second bearer type including at least one non-broadcast bearer.

In a first step 202, mapping information is accessed. The mapping information indicates that a particular content channel is distributed via a particular bearer type.

In a next step 204, switching to a bearer of the bearer type indicated in the mapping information is performed to enable reception of the particular content channel. The switching may be performed prior to reception of the particular content channel and/or during reception of the particular content channel.

Figure 3:
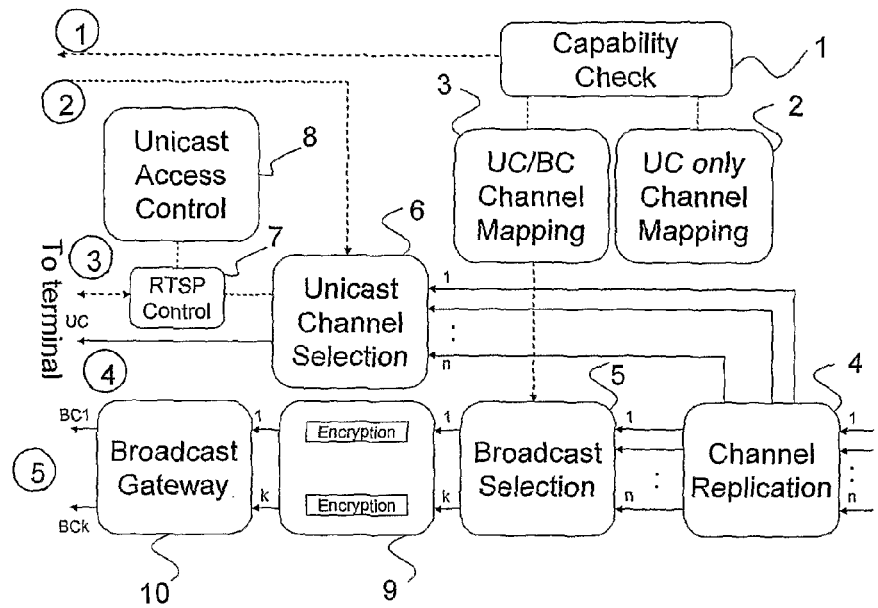
FIG. 3 is a schematic diagram of a content distribution controller embodiment of the present invention.

In the following, two network components of a network system that permits the dynamic distribution of content via different bearer types will be described in more detail. In this regard, FIG. 3 shows the network backend architecture in the form of a content distribution control device 300. The device 300 not only allows for a dynamic content distribution control. It also provides the content distribution services requested by one or more user terminals acting as clients.

When a new user terminal requests a content distribution service, a device component 1 first checks the terminal capabilities. If the requesting terminal does not support broadcast reception, it will receive a channel mapping table describing a "unicast-only" mapping in which all content channels are mapped to unicast bearers. This "unicast-only" mapping table is provided by component 2 and forwarded by component 1 via a first control connection to the terminal. If, on the other hand, the terminal is known to support broadcast reception, it will receive a mapping table which typically associates one or more content channels with unicast bearers and one or more further channels with broadcast bearers. This mapping table is provided by component 3 and forwarded by component 1 via the first control connection to the terminal.

A channel replication component 4 is configured to receive all incoming media packets corresponding to the available content channels. The channel replication component 4 replicates the incoming media packets for further processing both at the broadcast selector component 5 and the unicast selector component 6.

The broadcast selector component 5 maps media packets belonging to the content channels configured for broadcast distribution to k output channels which are further processed for delivery over broadcast bearers.

In an optional encryption component 9, the k output channels generated in the broadcast selector component 5 are encrypted if service access protection is required. Without encryption, every user terminal capable of receiving broadcast channels can receive the content channels delivered over the broadcast bearers.

The encryption component 9 forwards the encrypted data packets to a broadcast gateway 10. The broadcast gateway 10 maps the incoming packet flows to the individual broadcast bearers as indicated by BC1 to BCk.

The unicast selector component 6 selectively handles content channels that are to be delivered over unicast bearers. For each connected user terminal, the unicast selector component 6 selects one of the incoming content channels and forwards the corresponding media packets to the unicast connection established for the particular user terminal. Channel selection (and channel switching) requests are received from connected terminals via a second control connection and in accordance with a separate control protocol as will now be described in more detail.

In the present embodiment, the Real Time Streaming Protocol (RTSP) is used for establishing a unicast connection to a user terminal. To this end, an RTSP control component 7 communicating with the user terminal via a third control connection is provided. It should be noted that RTSP is only one possibility for connection establishment. Instead of RTSP, other control protocols fulfilling the same purpose could in principle also be used.

Still referring to FIG. 3, an optional service access protection component 8 is handling service access protection for those user terminals that are connected via unicast connections. The service access protection component 8 prevents unauthorized users from using a particular content service by checking for each incoming connection request whether the user terminal is actually authorized to use the content service.

Figure 4:
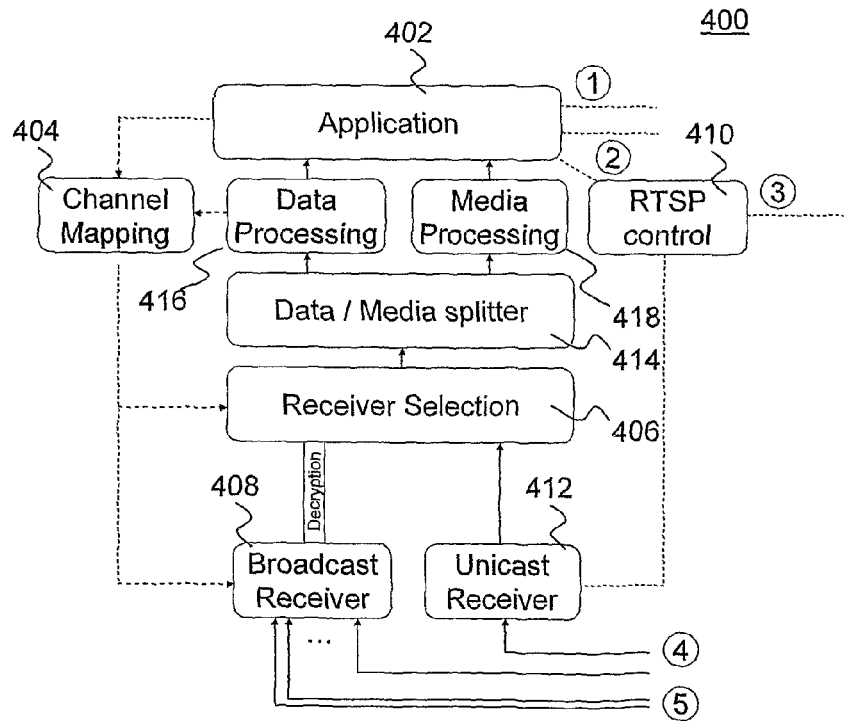
FIG. 4 is a schematic diagram of a content recipient embodiment of the present invention.

Referring now to FIG. 4, the client side of the network system for content distribution will be explained in more detail. FIG. 4 shows a device 400 for selectively receiving content via different bearer types.

The device 400 includes an application component 402 that receives, via a first control connection, channel mapping information in the form of a mapping table from the server side shown in FIG. 3. The mapping table is maintained in a channel mapping storage component 404. The mapping information contained in the mapping table is used by the receiver selection component 406 and the broadcast receiver component 408 as will be described below in more detail.

A second control connection is used by the application 402 to send channel selection commands to the backend device shown in FIG. 3, whereas a third control connection is used to establish a unicast connection via RTSP. To this end, an RTSP control component 410 is provided.

As shown in FIG. 4, unicast data are received by a unicast receiver component 412 via a unicast bearer (fourth connection), whereas broadcast data are received by the broadcast receiver component 408 via one or more broadcast bearers (fifth connection).

If the user selects a channel which is received over a unicast bearer, the receiver selection component 406 forwards packets received via the unicast bearer for further processing to a data/media splitter component 414. If, on the other hand, a channel is selected which is received over a broadcast bearer, the receiver selection component 414 forwards packets received over one of the broadcast bearers. An optional decryption component (not shown) decrypts packets received via the broadcast bearers in the case access protection is enabled.

The data/media splitter component 414 receives the packets forwarded by the receiver selection component 406 and separates mapping data received over a (logical) mapping data channel from media data. The mapping data channel is used to optionally send updates of the channel mapping table (e.g. as side information over the unicast or broadcast channels) in the case channel mapping is changed. The mapping data is forwarded by the data/media splitter component 414 to a mapping data processing component 416 which modifies the channel mapping information stired by the component 404 accordingly. The media data, on the other hand, is decoded and displayed to the user by the media processing component 418.

In a preferred implementation, the receiving device 400—when it connects to the serving device 400—first establishes a unicast connection through a session establishment protocol such as RTSP. The unicast connection can be kept open through the lifetime of the content delivery session between the two devices 300, 400. However, the serving device 300 preferably only sends data over the unicast connection if the receiving device 400 has requested a channel which is (currently) delivered over a unicast bearer. Otherwise, the receiving device 400 receives the content channel over a broadcast bearer (while the unicast connection remains established). In addition to the unicast connection, the receiving device 400 can listen to one or more content channels on broadcast bearers. Preferably, the broadcast channels are delivered through MBMS (although other broadcast technologies could be used as well).

In the following, various signalling embodiments showing messages that can be exchanged between the devices shown in FIGS. 3 and 4, or any other devices adapted for distribution and reception of content channels via different bearer types, will be discussed. The embodiments will be explained with respect to the distribution of content in the form of mobile TV services. Of course, the signalling could also be used in context with other content distribution services.

Figure 5:
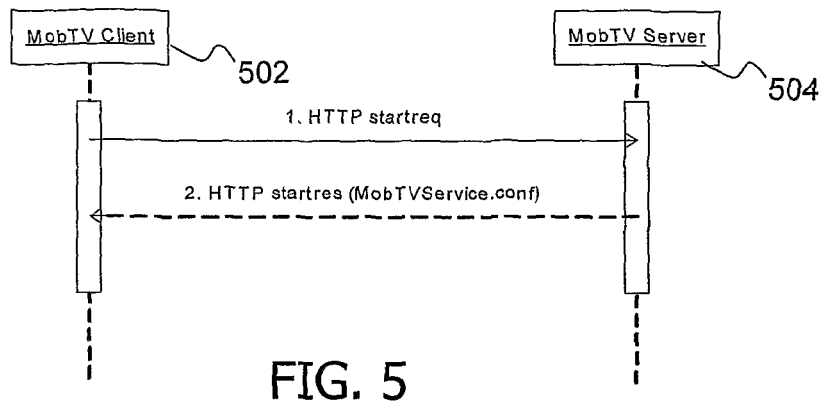
FIG. 5 is a first schematic signalling diagram that can be utilized in the embodiments of the present invention.

In FIG. 5, a mobile TV start sequence messaging scenario for obtaining service configuration data at client application start-up is shown. When a user starts a local mobile TV client application 502 in the user terminal, the client application 502 sends a start.req message via the Hypertext Transfer Protocol (HTTP) to a mobile TV server application 504. The client application 502 could for example reside on the reception device 400 of FIG. 4, whereas the server application 504 could reside on the content distribution controlling device 300 of FIG. 3.

As shown in FIG. 5, the server application 504 responds to the start.req message with a start.res message. The start.res message includes (among other information) service configuration information (in the form of a service configuration file) and the current channel mapping table.

The service configuration file describes content channels and transport bearer separately such that a dynamic mapping between content channels and transport bearers can be defined. The content channels in the service configuration file can be uniquely identified by a number, by a character string or by any other identification means. This identification allows to match the content channel descriptions with the local "key-binding" in the user terminal. In the service configuration file, the transport bearers are also uniquely identified, for example by their position within a list or by an explicit identifier (e.g. by a ServiceID).

For each broadcast bearer used by a particular content distribution service, the following parameters should be specified:
  IP Multicast Address/APN
  ServiceID (optional)
  Uniform Resource Identifier (URI) of Session Description Protocol (SDP) file Since the unicast transport bearer is "shared" among all content channels, it needs to be specified just once by an SDP:
  URI of SDP file The reference to the SDP file contained in the Service Description can be local (e.g. the SDP may be contained in the Service Description) or it points to a server from which the SDP file can be obtained.

Additionally, each user terminal needs to know the address of the application server which receives any channel switching requests.

Also, each user terminal needs to know the channel mapping table. The channel mapping table describes the mapping between content channels and transport bearers listed in the Service Description. Assuming that five content channels are numbered from 1 to 5, and further assuming that there are two available broadcast bearers BC#1 and BC#2, the mapping table could look as follows:
  1 UC
  2 UC
  3 BC#1
  4 UC
  5 BC#2

This mapping table indicates that content channels 3 and 5 are delivered over broadcast bearers BC#1 and BC#2, respectively, whereas all other content channels are delivered over unicast bearers. If required, one or more of the content channels may be associated with both a broadcast bearer and a unicast bearer. This means that the particular content channels could be received both via broadcast and via unicast.

Figure 6:
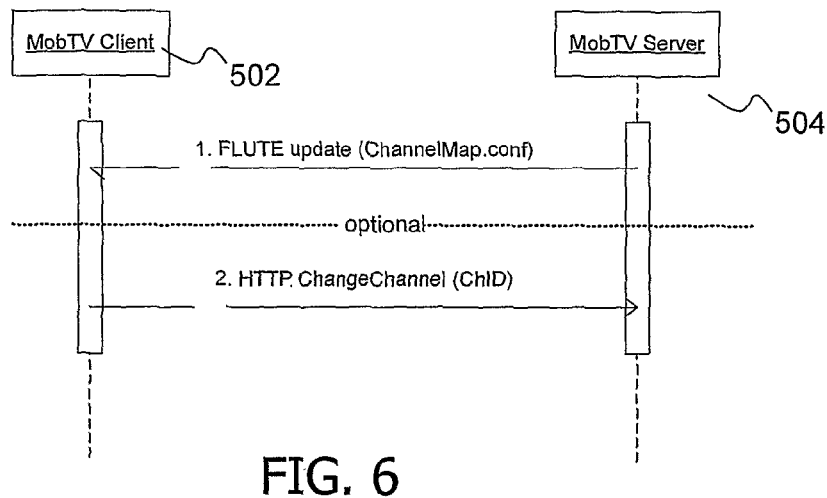
FIG. 6 is a second schematic signalling diagram that can be utilized in the embodiments of the present invention.

If the channel mapping changes while a user terminal is connected to the content server, the user terminal may be informed about the new channel mapping as exemplarily shown in the signalling diagram of FIG. 6.

To inform the mobile TV client application 502 about modifications in the channel mapping table, the mobile TV server application 504 sends an update message which includes a file (ChannelMap.conf) indicative of the new channel mapping. The update message may be distributed via all FLUTE data channels belonging to the particular mobile TV service. This may include MBMS broadcast channels, Packet-Switched (PS) streaming channels (unicast), DVB-H broadcast channels, and other channels. The client application 502 may thus receive multiple copies of the ChannelMap.conf file.

The channel mapping may for example change in such a manner that the server application 504 starts forwarding media packets of content channels via broadcast bearers and stops forwarding media packets of these channels over unicast bearers for clients who are able to receive broadcast transmissions. If an updated channel mapping indicates a transport bearer change—either from unicast to broadcast or vice versa—for the channel a user terminal is currently receiving, the client application 502 running on the user terminal must change the input connection accordingly. This means in the embodiment shown in FIG. 4 that the receiver selection component 406 switches either from broadcast to unicast reception or vice versa.

The switch from a broadcasted content channel to a content channel delivered over a unicast bearer (or vice versa) may explicitly be requested by a user terminal or commanded by the server application 504. If the user terminal requests such a switch, there exist two possible scenarios.

In a first scenario, the user terminal requests a switch from a broadcasted content channel to content channel delivered over unicast. In this case, the client application 502 sends a general "change channel" command to the server application 504 as shown in the lower half of FIG. 6. The "change channel" command may include an indication of the content channel in question. The server application 504 locally detects that the channel in question is to be delivered over a unicast bearer and starts forwarding media packets over the (preferably already established) unicast connection. As an alternative, the client application 502 could command the server application 504 explicitly to deliver the data of the indicated content channel over a unicast bearer. The client application 502 then stops listening to the broadcast bearer and starts listening to the unicast connection instead.

According to a second scenario, the user terminal requests a switch for a particular content channel that is currently delivered over a unicast connection to a broadcast bearer. Again, the client application 502 may send a general "change channel" command to the server. The server then locally detects that the requested content channel is to be delivered over a broadcast bearer and stops forwarding the media packets over the unicast bearer. Alternatively, the client application 502 could command the server application 504 explicitly to stop the delivery of media packets over the unicast bearer. Then, the client stops listening to the unicast bearer and starts listening to the broadcast bearer instead.

In the embodiment shown in FIG. 6, either the client application 502 or the server application 504 decide independently about bearer switching. In a particular useful bearer switching implementation, the client application 502 running on the user terminal provides the server application 504 with switching control information (such as usage information and/or location information with regard mobile user terminals). The server application 504 gathers switching control information from various client application 502, evaluates the gathered switching control information, and decides about initiation of bearer switching based on a result on the evaluation. In addition, or alternatively, the server application 504 may take other switching control information such as time of the day and/or predicted user interest into account. Thus, a network operator operating the server application 504 can adapt the mapping based on usage statistics, based on interest shifts (a news channel may for example get more attention during an election day), based on the time of the day (during evening hours other content channels are of interest than in the afternoon), etc.

In the following, various exemplary bearer switching concepts will be discussed in more detail. In general, bearer switching aims at associating content channels of high interest (i.e. with many listening user terminals) with broadcast bearers and at associating content channels of lower interest with unicast bearers.

In the case of a unicasted content channel, an operator may derive usage information from the server application (such as a mobile TV server application or a streaming server application). However, for broadcasted content channels an operator generally does not have content usage information. Moreover, an operator of a mobile network can often not determine whether a group of connected user terminals is located in one and the same coverage cell (i.e. in a densely populate cell) or spread over a large number of coverage cells. This is sometimes a drawback because in the case of a densely populate cell, it would often be efficient to transfer a unicasted content channel to a broadcast bearer. These and other problems are addressed by the following embodiments.

Figure 7:
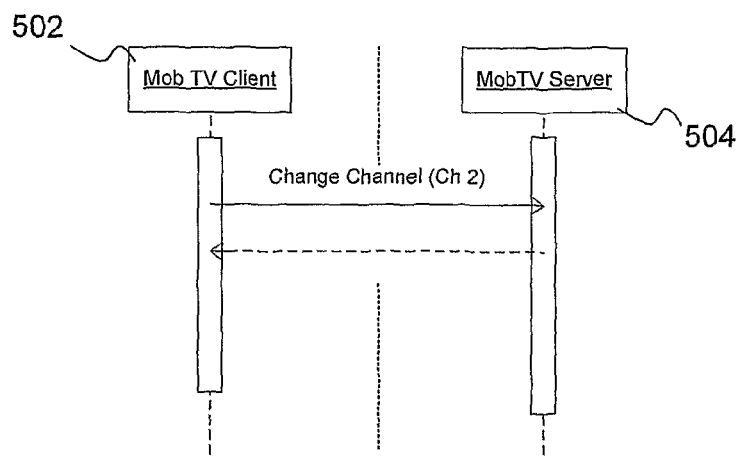
FIG. 7 is a third schematic signalling diagram that can be utilized in the embodiments of the present invention.

First, a scenario relating to content distribution via a unicast bearer (e.g. a mobile TV service delivered via PS streaming) will described with reference to FIG. 7. In this scenario, the server application 504 is readily aware of usage information for individual content channels as it keeps tracks of the established unicast connections. In general, each user terminal has activated an RTSP streaming session and often also an HTTP based channel control session. The client application 502 running on the user terminal may thus send a channel switching command via HTTP to the server application 504 as shown in FIG. 7. For mobile content delivery solutions such as mobile TV solutions the channel switching command may not only include a channel identifier, but additionally a cell identifier or any other geographical identifier. In the case of mobility (e.g. handovers between neighbouring cells), cell identifier changes may be sent to the server application 504 via an update message. As an alternative, the server application 504 could retrieve location information for the mobile terminal on which the client application 502 is running by contacting the network based location information service associated with the mobile terminal.

If no HTTP based channel control session is available (e.g. in the case of a plain PS streaming solution), location information could be forwarded inside the RTSP session set-up message. Updated location information could be provided via the RTSP Set Params method. Alternatively, the server application 504 could use the network based location information service to get the required location information.

As a second scenario, content distribution via broadcast bearers (using e.g. MBMS or DVB-H) will be described. In broadcast scenarios, there is typically no usage or location feedback from the client applications. Legacy TV receivers, for example, do not include any functionality to send a usage report towards the network. Mobile TV receivers, however, are often integrated into third generation (3G) handsets and can therefore be configured to send usage report towards the network. The usage reports may be sent in particular time intervals (such as once every fifteen minutes) or together with event reports or request (e.g. relating to channel changes). In principle, there are several alternatives to add a usage report functionality to client applications.

According to a first variant, usage reports could provided via a HTTP based feedback mechanism. According to the HTTP variant, the client application may use the HTTP POST method to upload usage information, or the HTTP GET message to request a new channel. Additionally, switching control information such as a cell identifier, an area identifier or, in the case of DVB-H, a multiplex identifier may be incorporated into the uploaded document or included into the HTTP header. The content channel identifier of the previously consumed (e.g. watched) content channel could also be provided as feedback.

Based on the content usage information, a usage reporting component of the server application may keep track of the number of users per content channel. To this end, a channel usage histogram may be used. In the case of a time based usage reporting scheme, either the identifier of the currently consumed content channel may be reported or, in the alternative, a detailed histogram (or statistics) of the content channels selected by the user within the particular reporting period.

Instead of a HTTP based feedback approach, the session initiation protocol (SIP)/IP multimedia subsystem (IMS) Notify method is used in a second variant. According to this variant, the server application subscribes to the usage reporting event on the user terminal. Optionally, a "virtual subscription" may be used. This means that the SIP/IMS notification procedure could be configured without subscribe method from the server application. The notification message can be generated responsive to a channel change event or on a timed basis (e.g. in regular intervals). In the case the notification message is triggered by a change of a content channel, the Notify message can be sent immediately after the content channel has been changed. Optionally, the previously consumed content channel may be a part of the notification.

Figure 8:
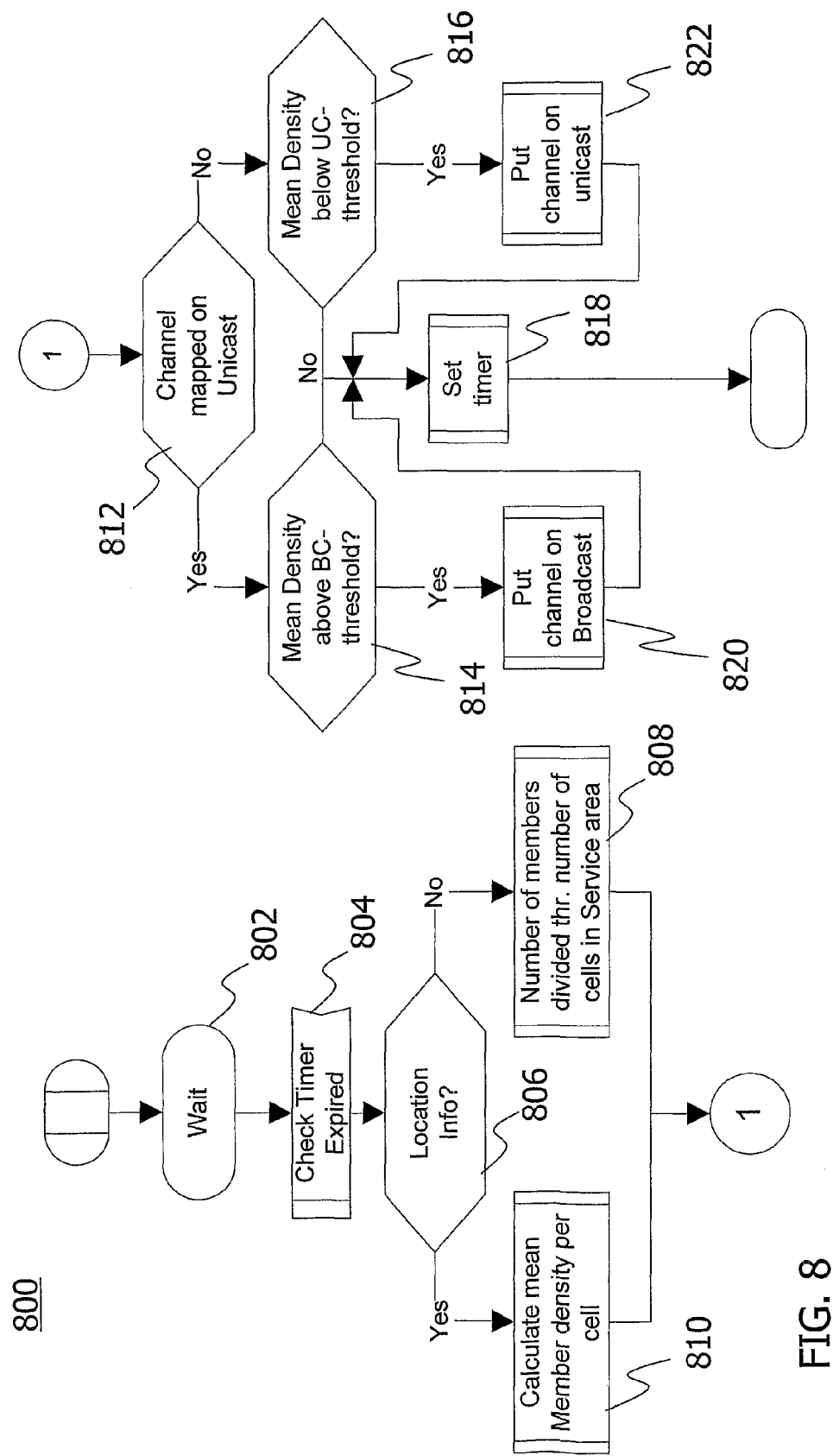
FIG. 8 is a process flow diagram of a channel switching embodiment of the present invention.

The above variants exemplarily illustrated a few possibilities for providing switching control information such as content usage information and location information to the server application. Based on the switching control information received from the client applications and/or determined locally, the server application may dynamically change the channel/bearer type mapping. In the following, an embodiment of a dynamic mapping mechanism will be described with reference to the process flow diagram 800 of FIG. 8. The mechanism shown in FIG. 8 is started periodically per content channel. Alternatively, the mechanism could be executed per content channel after a predefined amount of channel switching events have occurred. For instance, the mechanism may be executed each time after 1000 changes to and/or from a particular content channel have been counted.

Referring now to FIG. 8, the mechanism starts with a waiting period 802. During the waiting period 802, it is constantly monitored in step 804 whether a timer has expired. The timer may be set, for example, somewhere between 5 and 60 minutes (e.g. to 15 minutes).

Upon expiry of the timer in step 804, the method proceeds with step 806. Step 806 determines if location information is available for the user terminals receiving the particular content channel. In the case no (or no precise) location information is available, the mechanism proceeds with step 808. In step 808, a mean member density assuming a homogenous usage in the service area is determined. On the other hand, if it is determined in step 806 that location information is available, the mechanism proceeds with step 810. In step 810 the mean member density per coverage cell is calculated. Optionally, the mechanism may additionally calculate a peak density, give a 95% tile or apply any weighting function.

After the mean member density per cell has been calculated in either one of steps 808 and 810, the mechanism proceeds with step 812. In step 812 it is determined if the particular content channel for which the mechanism is executed is mapped to a unicast bearer. If it is determined that the channel is mapped to a unicast bearer, it is then determined in step 814 if the mean density is above a predefined broadcast switching threshold. If the mean density is above the predefined broadcast switching threshold, then the content channel currently transmitted via a unicast connection is put on a broadcast bearer in step 820.

If, on the other hand, it is determined in step 812 that the particular content channel is currently not mapped to a unicast bearer, it is then determined in a next step 816 if the mean member density is below a predefined unicast switching threshold. Should the mean member density be below the unicast switching threshold, then, in step 822, the channel currently associated with a broadcast bearer is put on a unicast bearer.

Accordingly, the broadcast switching threshold and the unicast switching threshold ensure that the available resources are utilized in an efficient manner. In the case of a high mean member density, content distribution via a broadcast bearer generally makes better use of the available resources, while in the case of a low mean member density unicast transmission is preferred. It should be noted that the mechanism may use different thresholds for switching to a broadcast bearer and for switching to a unicast bearer. Optionally, a hysteresis may be implemented to avoid flip-flop effects. One possible hysteresis implementation prevents further transport bearer switches during a predefined period of time (or before a predefined number of channel change events) after the last transport bearer switch has occurred. Another option would be to change the transport bearer mapping only if the determinations in blocks 814 and 816 have repeatedly indicated the need for a change in the mapping scheme.

After a bearer switching operation decision in step 820 or in step 822 has been performed or if the mean member density is below the broadcast switching threshold/above the unicast switching threshold (decision blocks 814 and 816), the timer is reset in step 818 and the mechanism loops back to step 802.

In context with bearer switching in either one of steps 820 and 822, the mapping information (such as a mapping table) will need to be updated. According to a first option, the updated mapping scheme (or an updated, channel-related portion thereof) may immediately be sent to the active client applications. According to another option, the updated mapping scheme (or mapping scheme portion) is only sent after the mechanism shown in FIG. 8 has been executed for all content channels. In the case of the second option, the actual bearer switching (steps 820 and 822) may be executed only after all content channel mappings have been checked. Optionally, the decision relating to mapping changes may also consider the capabilities of the connected user terminals. If, for example, a large portion of the user terminals has no broadcast capabilities, a change of the transport bearer mapping to broadcast bearers is often not feasible.

As has become apparent from the above description of preferred embodiments, the content distribution technique described herein allows a seamless integration of unicast and broadcast delivery within the same type of service (which, in some of the examples is mobile TV). This integration allows a network operator to decide which content channels are to be delivered over unicast bearers and which should be delivered over broadcast bearers. With an additional decision mechanism it is possible to automatically select a channel mapping scheme which utilizes the available broadcast bearers in an efficient manner. Another advantage is the fact that legacy user terminals (e.g. user terminals supporting only unicast content distribution) can connect to a service even if some content channels are scheduled for broadcast transmission. In such a scenario, the content channels may then additionally be delivered via unicast connections to the legacy user terminals.

In the above embodiments, the server application keeps track of how many user terminals are currently listening to a particular content channel. Accordingly, the server application can optimize the mapping between content channels and transport bearers. In one implementation, those content channels with the highest number of users will be mapped to the available broadcast transport bearers, whereas the remaining content channels are delivered over unicast bearers. Of course, more sophisticated mapping implementations could be used as well.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method of controlling the distribution of content to multiple user terminals using a first bearer type for a broadcast transport bearer and a second transport bearer type for a non-broadcast transport bearer, the method comprising the steps:
   simultaneously providing a plurality of logical content channels via a plurality of bearers, wherein each logical content channel is related to a particular content distribution service for a distribution of content to multiple users and is associated with at least one of a transport bearer of the first type and a transport bearer of the second type, the non-broadcast transport bearer being a unicast bearer;
   evaluating switching control information indicative of at least one of content usage information and location information of a particular logical content channel, wherein a mean member density per cell is calculated for the particular logical content channel;
   deciding about initiation of a bearer switching based on a result of the evaluation, wherein the particular logical content channel is switched from a unicast bearer to a broadcast bearer if the mean member density is greater than a predefined broadcast threshold;
   updating mapping information describing a dynamic mapping between the plurality of logical content channels and the transport bearers, wherein the mapping information is updated according to the bearer switching between the two bearer types for at least one content channel;
   distributing the updated mapping information to multiple user terminals; and
   initiating the bearer switching.

2. The method of claim 1, further comprising the steps of:
   receiving a change channel command indicating a particular content channel from any recipient; and
   performing, in response to the change channel command, bearer switching for the indicated content channel between the two bearer types.

3. The method of claim 1, further comprising the steps:
   evaluating switching control information;
   deciding about initiation of bearer switching based on a result of the evaluation.

4. The method of claim 1, wherein the mapping information comprises for each content channel a content channel identifier and an associated access descriptor.

5. The method of claim 1, wherein the at least one broadcast bearer comprises at least one multicast bearer.

6. The method of claim 1, further comprising the steps:
   establishing the non-broadcast transport bearer between a content distribution controller and one or more content recipients; and
   maintaining the non-broadcast transport bearer during a content distribution session regardless of changes during the content distribution session of the bearer type via which the particular content channel is provided.

7. The method of claim 3, wherein the switching control information pertains to at least one of content usage information, time of day, predicted user interest, and location information with regard to mobile content recipients.

8. The method of claim 3, further comprising the step:
   gathering switching control information received from a plurality of content recipients.

9. The method of claim 6, further comprising the step:
   sending channel switching information via the non-broadcast bearer to the content distribution controller.

10. A device for controlling the distribution of content to multiple user terminals using a first bearer type for a broadcast transport bearer and a second bearer type for a non-broadcast transport bearer, the device comprising:
    a processor;
    a memory comprising program code which when executed by the processor cause the device to:
    simultaneously provide a plurality of logical content channels via a plurality of bearers, wherein each logical content channel is related to a particular content distribution service for a distribution of content to multiple users and is associated with at least one of a transport bearer of the first type and a transport bearer of the second type, the included at least one non-broadcast transport bearer being a unicast bearer;
    evaluate switching control information indicative of at least one of content usage information and location information of particular logical content channel, wherein a mean member density per cell is calculated for the particular logical content channel;
    decide about initiation of a bearer switching based on a result of the evaluating component, wherein the particular logical content channel is switched from a unicast bearer to a broadcast bearer if the mean member density is greater than a predefined broadcast threshold;
    update mapping information describing a dynamic mapping between the plurality of logical content channels and the transport bearers, wherein the mapping information is updated according to the bearer switching between the two bearer types for at least one content channel;
    distribute the updated mapping information to multiple user terminals; and
    initiate the bearer switching.

* * * * *